(12) United States Patent
Ansari et al.

(10) Patent No.: US 10,958,559 B2
(45) Date of Patent: Mar. 23, 2021

(54) SCALED INTER-DOMAIN METRICS FOR LINK STATE PROTOCOLS

(71) Applicant: Juniper Networks, Inc., Sunnyvale, CA (US)

(72) Inventors: Abdul Majid Ansari, Ashburn, VA (US); Steven M. Kensil, Milford, MA (US); Bharath RadhaKrishna Bhat, Bangalore (IN); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 513 days.

(21) Appl. No.: 15/199,238

(22) Filed: Jun. 30, 2016

(65) Prior Publication Data

US 2017/0366444 A1 Dec. 21, 2017

(30) Foreign Application Priority Data

Jun. 15, 2016 (IN) .............................. 201641020463

(51) Int. Cl.
*H04L 12/751* (2013.01)
*H04L 12/715* (2013.01)
(Continued)

(52) U.S. Cl.
CPC .......... *H04L 45/02* (2013.01); *H04L 12/4633* (2013.01); *H04L 45/04* (2013.01); *H04L 45/12* (2013.01)

(58) Field of Classification Search
CPC ..... H04L 12/4633; H04L 45/02; H04L 45/04; H04L 45/12
See application file for complete search history.

(56) References Cited

U.S. PATENT DOCUMENTS 5,570,084 A 10/1996 Ritter et al.
6,760,328 B1 7/2004 Ofek
(Continued)

FOREIGN PATENT DOCUMENTS

CN 105376162 A 3/2016
CN 105591937 A 5/2016

OTHER PUBLICATIONS

Extended Search Report from counterpart European Application No. 17176067.1, dated Jan. 12, 2018, 21 pp.
(Continued)

*Primary Examiner* — Mansour Oveissi
(74) *Attorney, Agent, or Firm* — Shumaker & Sieffert, P.A.

(57) ABSTRACT

In general, techniques are described by which to provide a scaled end-to-end view of link metrics to integrate multiple non-uniform Interior Gateway Protocol ("IGP") domains. For example, an Accumulated Interior Gateway Protocol ("AIGP") attribute, a non-transitive BGP attribute, which includes a link metric assigned to a link within a first IGP domain, is scaled to conform to a metric scale of the second IGP domain. The AIGP attribute may also add link metric assigned to a link within the second IGP domain and may add static metrics of non-IGP links connecting the IGP domains. An IGP domain may set its IGP to the scaled AIGP attribute such that the link metric may include a uniformly scaled end-to-end view of link metrics across the IGP domains. Additionally, a sham-link is assigned a metric value in accordance with the scaling techniques.

14 Claims, 4 Drawing Sheets

(51) Int. Cl.
  *H04L 12/46* (2006.01)
  *H04L 12/721* (2013.01)

(56) References Cited

U.S. PATENT DOCUMENTS

| | | | |
|---|---|---|---|
| 6,985,490 B2 | 1/2006 | Czeiger et al. | |
| 7,042,838 B1 | 5/2006 | Shand et al. | |
| 7,099,286 B1 | 8/2006 | Swallow | |
| 7,178,059 B2 | 2/2007 | Greenspan et al. | |
| 7,184,437 B1 | 2/2007 | Cole et al. | |
| 7,519,006 B1 | 4/2009 | Wing | |
| 7,522,603 B2 | 4/2009 | Vasseur | |
| 7,602,778 B2 | 10/2009 | Guichard et al. | |
| 7,710,872 B2 | 5/2010 | Vasseur | |
| 7,808,919 B2 | 10/2010 | Nadeau et al. | |
| 7,937,492 B1 | 5/2011 | Kompella et al. | |
| 7,965,699 B1 | 6/2011 | Accardi et al. | |
| 8,027,354 B1 | 9/2011 | Portolani et al. | |
| 8,077,726 B1 | 12/2011 | Kumar et al. | |
| 8,339,959 B1 | 12/2012 | Moisand et al. | |
| 8,611,359 B1* | 12/2013 | Kompella | H04L 45/04 370/401 |
| 8,699,499 B2 | 4/2014 | Mulligan et al. | |
| 8,909,602 B2 | 12/2014 | Soundararajan et al. | |
| 8,954,601 B1* | 2/2015 | Patro | H04L 45/02 370/395.31 |
| 8,959,185 B2 | 2/2015 | Nakil et al. | |
| 9,444,721 B2 | 9/2016 | Zhang et al. | |
| 10,200,204 B2 | 2/2019 | Wang | |
| 2002/0133756 A1 | 9/2002 | Jain | |
| 2003/0137978 A1 | 7/2003 | Kanetake | |
| 2004/0042406 A1 | 3/2004 | Wu et al. | |
| 2004/0223497 A1 | 11/2004 | Sanderson et al. | |
| 2005/0041676 A1 | 2/2005 | Weinstein | |
| 2005/0220014 A1 | 10/2005 | DelRegno et al. | |
| 2006/0256724 A1* | 11/2006 | Martini | H04L 45/04 370/238 |
| 2007/0086363 A1 | 4/2007 | Wakumoto | |
| 2007/0195797 A1 | 8/2007 | Patel et al. | |
| 2007/0260746 A1 | 11/2007 | Mirtorabi et al. | |
| 2008/0025309 A1 | 1/2008 | Swallow | |
| 2008/0056264 A1 | 3/2008 | Ong | |
| 2008/0151768 A1 | 6/2008 | Liu | |
| 2008/0151783 A1 | 6/2008 | Bamba | |
| 2010/0061242 A1 | 3/2010 | Sindhu et al. | |
| 2010/0208741 A1 | 8/2010 | Vasseur | |
| 2011/0103228 A1 | 5/2011 | Sheth et al. | |
| 2012/0069847 A1* | 3/2012 | Saad | H04L 45/02 370/392 |
| 2012/0224506 A1* | 9/2012 | Gredler | H04L 45/04 370/254 |
| 2013/0074066 A1 | 3/2013 | Sanzgiri et al. | |
| 2013/0163606 A1 | 6/2013 | Bagepalli et al. | |
| 2013/0232492 A1 | 9/2013 | Wang | |
| 2013/0329571 A1 | 12/2013 | Shimokawa et al. | |
| 2014/0269407 A1 | 9/2014 | Anand et al. | |
| 2017/0034039 A1* | 2/2017 | Yadlapalli | H04L 45/02 |
| 2017/0366444 A1 | 12/2017 | Ansari et al. | |

OTHER PUBLICATIONS

Oran, "OSI IS-IS Intra-domain Routing Protocol," RFC 1142, Network Working Group, Feb. 1990, 157 pp.
Moy, "OSPF Version 2," RFC 2328, Network Working Group, Apr. 1998, 197 pp.
Rekhter et al., "Carrying Label Information in BGP-4," RFC 3107, Network Working Group, May 2001, 8 pp.
Rekhter et al., "A Border Gateway Protocol 4 (BGP-4)," RFC 4271, Network Working Group, Jan. 2006, 104 pp.
Rosen et al., "OSPF as the Provider/Customer Edge Protocol for BGP/MPLS IP Virtual Private Networks (VPNs)," RFC 4577, Network Working Group, Jun. 2006, 25 pp.
Coltun et al., OSPF for IPv6, RFC 5340, Network Working Group, Jul. 2008, 94 pp.
Sheth et al., "OSPF Hybrid Broadcast and Point-to-Multipoint Interface Type," RFC 6845, Internet Engineering Task Force (IETF), Jan. 2013, 9 pp.
Mohapatra et al., "The Accumulated IGP Metric Attribute for BGP," RFC 7311, Internet Engineering Task Force (IETF), Aug. 2014, 15 pp.
"Understanding OSPF Sham Links," Juniper Networks, retrieved from http://www.juniper.net/techpubs/en_US/iunose15.1/topics/concept/ospf-sham-links-overview.html, Aug. 18, 2014, 2 pp.
Hegde et al., "Advertising per-node administrative tags in OSPF," Open Shortest Path First IGP Internet Draft, draft-ietf-ospf-node-admin-tag-09, Nov. 17, 2015, 15 pp.
Lindem et al., "OSPFv3 LSA Extendability," Network Working Group Internet Draft, draft-acee-ospfv3-lsa-extend-01.txt, Jul. 15, 2013, 27 pp.
Response to Extended Search Report dated Nov. 19, 2018, from counterpart European Application No. 17176067.1, filed Mar. 19, 2019, 10 pp.
Examination Report from counterpart European Application No. 17176067.1, dated Nov. 19, 2018, 6 pp.
"Dual Stack Network," Cisco, Oct. 15, 2010, 2 pp.
"Information technology—Telecommunications and information exchange between systems—Intermediate system to Intermediate system intra-domain routeing information exchange protocol for use in conjunction with the protocol for providing the connectionless-mode Network Service (ISO 8473)," International Standard, ISO/IEC 10589, Apr. 30, 1992, 155 pp.
"Systemd-networkd-wait-online: Wait ALL links to gain a carrier," Issue #2037, Github, Nov. 26, 2015, 5 pp.
Aggarwal et al. "MPLS Upstream Label Assignment and Context-Specific Label Space", IETF RFC 5331, Network Working Group, Aug. 2008, 14 pp.
Atlas, "Basic Specification for IP Fast Reroute: Loop-Free Alternates" Network Working Group, RFC 5286, Sep. 2008, 32 pgs.
Ayer, "Beware the IPv6 DAD Race Condition," Blog, Nov. 29, 2012, 5 pp.
Berger, "The OSPF Opaque LSA Option" Network Working Group, RFC 5250, Jul. 2008, 18 pgs.
Callon, "Use of OSI IS-IS for Routing in TCP/IP and Dual Environments," Network Working Working Group, RFC 1195, Dec. 1990, 86 pp.
Clausen et al., "The Optimized Link State Routing Protocol Version 2," Mobile Ad hoc Networking (MANET), Internet Draft, draft-ietf-manet-olsrv2-17, Oct. 14, 2012, 110 pp.
Cloud Computing and Security—A Natural Match, Trusted Computing Group, Apr. 2010, 5 pp.
Ishiguro, "Traffic Engineering Extensions to OSPF Version 3", Network Working Group, RFC 5329, Sep. 2008, 13 pgs.
Katz et al. "Traffic Engineering (TE) Extensions to OSPF Version 2" Network Working Group, RFC 3630, Sep. 2003, 14 pgs.
Katz et al., "Three-Way Handshake for IS-IS Point-to-Point Adjacencies," Network Working Group, RFC 5303, Oct. 2008, 12 pp.
Kompella et al. "IS-IS Extensions in Support of Generalized Multi-Protocol Label Switching (GMPLS)" Network Working Group, RFC 5307, Oct. 2008, 13 pgs.
Li et al. "IS-IS Extensions for Traffic Engineering" Network Working Group, RFC 5305, Oct. 2008, 18 pgs.
Lindem et al. "Extensions to OSPF for Advertising Optimal Router Capabilities" Network Working Group, RFC 4970, Jul. 2007, 13 pgs.
Litkowski, "Operational Management of Loop Free Alternates" draft-litkowski-rtgwg-lfa-manageability-01, Routing Area Working Group, Internet-Draft, Feb. 18, 2013, 17 pgs.
Osborne, "Extended Administrative Groups in MPLS-TE" draft-osborne-mpls-entended-admin-groups-00, Network Working Group, Internet-Draft, Feb. 13, 2013, 5 pgs.
Osborne, Eric and Ajay Simha "How CSPF Works" Traffic Engineering with MPLS: Chapter 4, Publisher: Cisco Press, Jul. 17, 2002, available at http://cisco-press-traffic-engineering.org.ua/1587050315/ch04lev1sec2.html (accessed Jun. 21, 2011).
Previdi, "A Policy Control Mechanism in IS-IS Using Administrative Tags", Network Working Group, RFC 5130, Feb. 2008, 9 pgs.

(56) References Cited

OTHER PUBLICATIONS

Przygienda et al., "M-ISIS: Multi Topology (MT) Routing in Intermediate System to Intermediate Systems (IS-ISs)," Network Working Group, RFC 5120, Feb. 2008, 15 pp.
Rosen et al., "MPLS Label Stack Encoding," RFC 3032, Network Working Group, Jan. 2001, 24 pp.
Shirasaki et al., "A Model of IPv6/1Pv4 Dual Stack Internet Access Service," Network Working Group, RFC 4241, Dec. 2005, 11 pp.
TCG Trusted Network Connect, TNC IF-MAP Binding for Soap, Specification version 2.1, Revision 15, May 7, 2012, 81 pp.
Trusted Multi-Tenant Infrastructure Work Group FAQ, Trusted Computing Group, Sep. 2010, 2 pp.
First Office Action and Search Report, and translation thereof, from counterpart Chinese Application No. 201710455171.7, dated Jan. 15, 2020, 19 pp.

\* cited by examiner

SCALED INTER-DOMAIN METRICS FOR LINK STATE PROTOCOLS

This application claims the benefit of India Patent Application 201641020463, filed Jun. 15, 2016, the entire contents of which are hereby incorporated by reference.

TECHNICAL FIELD

The techniques of this disclosure relate to computer networks and, more specifically, providing routing information in computer networks.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Certain devices within the network referred to as routers use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many intra-network routing protocols use flooding-based distribution mechanisms to announce topology information to routers within the network. These intra-network routing protocols typically rely on routing algorithms that require each of the routers to have synchronized routing topology information. For example, Open Shortest Path First (OSPF) and Intermediate system to intermediate system (IS-IS) routing protocols are link state protocols that use messages conveying link state representations to ensure their routing topology is synchronized with respect to available interfaces, metrics and other variables associated with network links. For example, OSPF utilizes Link State Advertisements (LSAs) while IS-IS uses Link State Protocol Data Units (PDUs) to exchange information concerning the topology of the network. Messages such as those used to convey link state representations in accordance with a link state protocol are generally referred to herein as link state advertisements (LSAs), and OSFP LSAs and IS-IS LS PDUs are examples of such LSAs.

Receiving routers construct and maintain their own network topologies using the information received via the link state advertisements. These link state advertisements may include information identifying a cost metric associated with the link, as well as any other constraints commonly employed for selecting a path through a network in accordance with a link state protocol. As such, each router within a given IGP domain (which usually extends throughout but does not extend beyond an Autonomous System) maintains and constructs a representation of the topology of the IGP domain.

Each router within the IGP domain may compute distance for each path between two nodes as a function of the cost metrics assigned to each link along the path. Each router may next select a so-called "best path" or "shortest path" between two nodes as the path between the two nodes with the shortest distance (i.e., the lowest total cost metric computed as a function of the cost metrics assigned to each link along the path). Each router may repeat this process to identify a best path between every pair of nodes in the network, thereby resolving the representation of the topology of the network to identify forwarding information used for forwarding network traffic along the identified best paths.

Given that IGPs are restricted to providing information concerning the interior of the network, IGPs are generally limited in scope to a single Autonomous System. To stitch together multiple Autonomous Systems, routers located at the edge of the Autonomous System, which may be referred to as Autonomous System border routers (ASBR), may execute an exterior routing protocol, such as Border Gateway Protocol (BGP) or BGP labeled unicast protocol (BGP-LU), or the like. BGP exchanges routing and reachability information among Autonomous Systems (AS). BGP however may not preserve link state information, such as cost metrics assigned to individual links.

To overcome the deficiencies of BGP in terms of communicating link state information, the core network may execute Accumulated IGP (AIGP), which enables BGP or BGP-LU to carry IGP metrics across IGP domains. For example, AIGP provides an AIGP attribute, a non-transitive BGP path attribute, which includes an accumulated IGP metric. A router may receive the AIGP attribute and determine the distance between two nodes across IGP domains using the accumulated IGP metric. Utilizing AIGP may however inject various issues into the path selection process as a result of non-uniform deployment of IGP throughout the various IGP domains.

SUMMARY

In general, techniques are described in which a scaled end-to-end inter-network view of link metrics provide integration of multiple non-uniform Interior Gateway Protocol ("IGP") domains. For example, an Accumulated Interior Gateway Protocol ("AIGP") attribute, a non-transitive BGP attribute, which includes a link metric assigned to a link within a first IGP domain, is scaled to conform to a metric scale of the second IGP domain. The scaled AIGP attribute may also add a link metric assigned to a link within the second IGP domain, and may add static metrics of non-IGP links connecting the IGP domains. An IGP domain may update a representation of a topology of the network based on the AIGP attribute such that the link metric may include a uniformly scaled end-to-end view of link metrics across the IGP domains. In this way, a router may select a path through the network based on the updated representation of the topology of the network and forward network traffic along the selected path.

In one example, a method includes receiving, by a network device positioned on a border of a second IGP domain, a link metric assigned to a link within a first IGP domain. The method also includes scaling, by the network device, the link metric assigned to the link within the first IGP domain to conform the link metric assigned to the link within the first IGP domain to a metric scale of the second IGP domain. The method also includes updating, by the network device, a representation of a topology of a network including the first and second IGP domains to include the scaled link metric.

In another example, a router includes at least one processor coupled to a memory, wherein the processor executes software configured to: receive a link metric assigned to a link within a first IGP domain; scale the link metric assigned to the link within the first IGP domain to conform the link metric assigned to the link within the first IGP domain to a metric scale of the second IGP domain; and update a representation of a topology of a network including the first and second IGP domains to include the scaled link metric.

In another example, a computer system includes one or more processors, one or more computer-readable memories, and one or more non-transitory computer-readable storage mediums; program instructions stored on at least one of the one or more storage mediums for execution by at least one of the one or more processors via at least one of the one or more memories, to receive a link metric assigned to a link within a first IGP domain; program instructions stored on at least one of the one or more storage mediums for execution by at least one of the one or more processors via at least one of the one or more memories, to scale the link metric assigned to the link within the first IGP domain to conform the link metric assigned to the link within the first IGP domain to a metric scale of the second IGP domain; and program instructions stored on at least one of the one or more storage mediums for execution by at least one of the one or more processors via at least one of the one or more memories, to update a representation of a topology of a network including the first and second IGP domains to include the scaled link metric.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
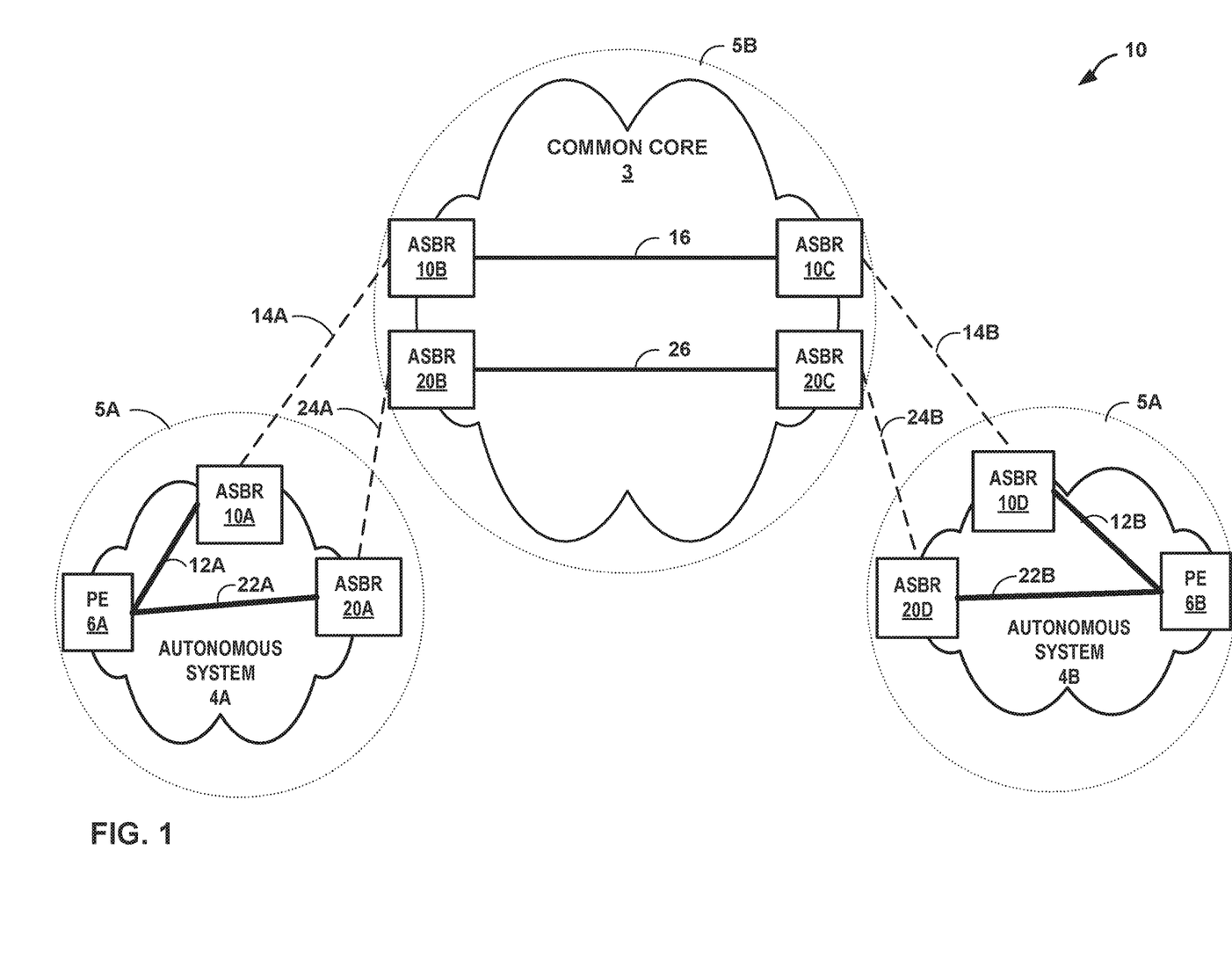
FIG. 1 is a block diagram illustrating an example network that operates in accordance with various aspects of the techniques described in this disclosure to join together IGP domains having non-uniform deployments of IGP.

FIG. 1 is a block diagram illustrating an example network 10 that operates in accordance with various aspects of the techniques described in this disclosure to join together IGP domains having non-uniform deployments of IGP. In the example of FIG. 1, network 10 includes a number of Autonomous Systems 4A, 4B (collectively, "AS 4"). Although the illustration in FIG. 1 discloses two Autonomous Systems, network 10 may include any number of Autonomous Systems. Each of AS 4 represents a single network or a group of networks controlled by a common network administrator for a single administrative entity (e.g., a business enterprise or business division). As described herein, Autonomous System may commonly be referred to as a routing domain or interior gateway protocol ("IGP") domain. In the example of FIG. 1, each of AS 4 executes IGP to form IGP domain 5A, whereas common core 3 executes another IGP to form IGP domain 5B.

In the example of FIG. 1, common core 3 may represent a core network for exchanging routes between provider edge routers 6A, 6B (where provider edge routers 6A, 6B may collectively be referred to as "PEs 6") of respective AS 4. Common core 3 may provide paths for the exchange of information between the different Autonomous Systems via various protocols. Common core 3 may also implement protocols including border gateway protocol labeled unicast protocol (BGP-LU), Resource Reservation Protocol (RSVP), or Label Distribution Protocol (LDP) protocols to forward packets across the core.

In the example of FIG. 1, routers within AS 4 may implement IGP to internally exchange link state information, e.g., cost metrics, and facilitate forwarding of packets or other data units between endpoint devices throughout a single routing domain (which may be referred to as "IGP domain"). Examples of IGPs include an Open Shortest Path First (OSPF) routing protocol and an Intermediate System to Intermediate System (IS-IS) routing protocol. OSPF and IS-IS are examples of IGP that use link state representations to convey metrics, available interfaces, and other variables associated with network links. For example, OSPF utilizes Link State Advertisements (LSAs) while IS-IS uses Link State Protocol Data Units (PDUs) to exchange information. In one example, AS 4A, 4B may implement OSPF to convey link state representations internally to ensure their routing topology is synchronized with respect to available metrics, interfaces, and other variables associated with network links. In contrast, common core 3 may implement IS-IS to convey link state representations.

In general, link state advertisements output by routers specify network links to other routers within the routing domain and associated cost metrics. Based on the communicated link state advertisements, the routers may configure a representation of the topology. For example, routers may form a data structure representing the links between corresponding routers and their associated cost metrics. The routers may then implement a path selection algorithm (e.g., Dijkstra's algorithm) based on the link state advertisements to determine the "shortest path" or "best path" through the network for each source and destination of data packets. Each router may forward traffic using the shortest path.

PEs 6 of AS 4 may be interconnected by boundary routers, such as Autonomous System Boundary Routers ("ASBR") 10A-10D, 20A-20D, wherein each of the ASBRs acts as a gateway to routers outside respective IGP domains. ASBRs may interconnect PEs 6 and common core 3 via an inter-network protocol such as BGP or BGP-LU such that ASBRs 10 and 20 may advertise routing information associated with routers of an Autonomous System. Each router within the BGP network typically forwards packets according to routes stored at the router and the destination address of the data packets. BGP however does not preserve link state information, such as cost metrics assigned to individual links. As one example, ASBRs 10C, 10D, 20C, and 20D may interconnect PE 6B and common core 3. Similarly, ASBRs 10A, 10B, 20A, and 20B may interconnect PE 6A and common core 3.

Links 14A, 14B (collectively, "links 14") may provide interconnectivity between ASBRs 10. Similarly, links 24A, 24B (collectively, "links 24") may provide interconnectivity between ASBRs 20. Links 14 and 24 are non-IGP links and do not include a cost metric.

To overcome the lack of communicating link state information via BGP, the core network may execute Accumulated IGP (AIGP), which enables BGP or BGP-LU to carry IGP metrics across IGP domains. For example, AIGP provides an AIGP attribute, a non-transitive BGP path attribute, which includes an accumulated IGP metric. A router may receive the AIGP attribute and determine the distance between two nodes across IGP domains using the accumulated IGP metric. Further examples of AIGP are described in RFC 7311, by P. Mohapatra et al., entitled "The Accumulated IGP Metric Attribute for BGP," dated August 2014, which is hereby incorporated by reference in its entirety.

Utilizing AIGP may however inject various issues into the path selection process as a result of non-uniform deployment of IGP throughout the various IGP domains. For example, common core 3 may operate with a different IGP metric scheme than IGP metric scheme of AS 4A, 4B. AS 4A, 4B may each implement one IGP (e.g., OSPF) where a 10 Gigabit Ethernet link in this IGP domain may have a metric scale of 10, whereas common core 3 may implement another IGP (e.g., IS-IS) where a 10 Gigabit Ethernet link in this IGP domain may have a metric scale of 100. As a result of the different metric scales, the cost metrics are inaccurately advertised between the IGP domains. Moreover, AIGP does not account for cost metrics of non-IGP links, e.g., links 14 and 24. As such, routers utilizing AIGP may inaccurately determine the shortest path between two nodes (e.g., PE 6A to PE 6B) across multiple non-uniform IGP domains.

In accordance with the techniques described in this disclosure, ASBRs 10 and 20 may include a scaling technique for conforming link metrics across non-uniform IGP domains 5. As further described below, routers, such as ASBRs 10 and 20 that forward link metrics communicated by remote PEs 6, apply arithmetic operations to scale the link metrics of one of IGP domains 5 to conform with the metric scale of another one of IGP domains 5.

In operation, AS 4B may implement IGP (e.g., OSPF) such that link state advertisements from AS 4B may include a cost metric associated with the links in AS 4B. ASBR 10D may redistribute the link metric assigned to a link within AS 4B using BGP (as an AIGP attribute). For example, ASBR 10D may swap an IGP label with a corresponding BGP label and forward the message towards common core 3. To illustrate, AS 4B may have an accumulated IGP metric of 1000. When ASBR 10D receives the packet, ASBR 10D has a BGP path to a remote PE (e.g., PE 6A) via a remote ASBR (e.g., ASBR 10A). ASBR 10D may swap the IGP label with a corresponding BGP label, which includes an AIGP attribute with an IGP metric of AS 4B, and forwards the packet towards common core 3.

When ASBR 10C (boundary router of IGP domain 5B) receives the AIGP attribute, the policies (as further described below) of ASBR 10C are configured to translate the AIGP attribute to conform to the metric scale of IGP domain 5B. As described above, the AIGP attribute includes a cost metric of IGP domain 5A (which implements OSPF). IGP domain 5B, which implements a different IGP (e.g., IS-IS), may use a metric scale of 100 for a 10 Gigabit Ethernet link, whereas AS 4B of IGP domain 5A may use a metric scale of 10 for the same 10 Gigabit Ethernet link. An administrator of network 10 may configure ASBR 10C to adjust the scale of the AIGP attribute, e.g., by multiplying the AIGP attribute of AS 4B (1000) by 10, such that the AIGP attribute (which includes IGP metric of AS 4B of IGP domain 5A) may conform to the metric scale of IGP domain 5B. ASBR 10C may push the appropriate label (e.g., LDP, RSVP, etc.) and forward to ASBR 10B.

ASBR 10B may add the cost metric assigned to a link within common core 3 to the scaled AIGP attribute such that the AIGP attribute may join IGP domain 5B with IGP domain 5A. To illustrate, IGP domain 5B may have a metric value of 100. ASBR 10B may add the IGP metric value of 100 of IGP domain 5B to the scaled AIGP attribute that includes IGP metric of 1000 for AS 4B.

ASBR 10B may forward the AIGP attribute towards destination PE 6A, thereby reversing the operations performed above. For example, ASBR 10B may scale the AIGP attribute to conform to the metric scale of IGP domain 5A. Using the example above, ASBR 10B receives the AIGP attribute that is currently scaled to conform to common core 3 (e.g., AS 4B metric of 10,000; core metric of 100). Like AS 4B, AS 4A may also implement OSPF and use the same metric scale. ASBR 10B may therefore scale the AIGP attribute to conform to the metric scale of IGP domain 5A. For example, the AIGP attribute that includes IGP metrics for AS 4B (e.g., 10,000) and common core 3 (e.g., 100) is divided by 10 such that the AIGP attribute conforms to the scale of IGP domain 5A. In this way, the scaled AIGP attribute may provide an updated representation of a topology of network 10 including uniformly scaled IGP metrics for AS 4B (e.g., 1000) and common core 3 (e.g., 10).

The techniques of this disclosure may also provide the addition of static metrics to the AIGP attribute for non-IGP links 14 and 24 interconnecting ASBRs. As one example, a BGP session may be configured on non-IGP link 14B that interconnects ASBR 10C and ASBR 10D, and another BGP session may be configured on non-IGP link 14A that interconnects ASBR 10A and ASBR 10B. ASBRs 10B, 10C may assign static metrics (e.g., static metric value of 1) for links 14A, 14B, respectively, and add the static metrics to the AIGP attribute. ASBRs 10B, 10C may further scale the static metrics assigned to links 14A, 14B to conform the static metrics to the metric scale of a corresponding one of IGP domain 5. In this way, the AIGP attribute may include scaled IGP metrics for non-IGP links.

To illustrate, ASBR 10C may assign, continuing the example from above, a static metric of 1 for non-IGP link 14B that interconnects ASBR 10C and ASBR 10D. ASBR 10C may scale the static metric of link 14B by 10 such that the static metric for link 14B conforms to the metric scale of IGP domain 5B. In this way, the distance from ASBR 10C to PE 6B may be 10,010 (e.g., cost metric of 10,000 for AS 4B scaled to IGP domain 5B, and static metric of 10 for link 14B) based on the metric scale of IGP domain 5B.

Similarly, ASBR 10B may assign and add a static metric for link 14A interconnecting ASBR 10A to ASBR 10B. ASBR 10B may assign a static metric (e.g., static metric value of 1) for link 14A and add the static metric in the AIGP attribute. ASBR 10B may scale the static metric of link 14A by 10 such that the static metric for link 14A conforms to the metric scale of IGP domain 5A. As such, ASBRs may update the AIGP attribute such that the AIGP attribute may provide a uniformly scaled end-to-end inter-network metric view from ASBR 10A to PE 6B, including metric links assigned to non-IGP links.

ASBR 10A may receive the updated AIGP attribute that provides a uniformly scaled end-to-end inter-network metric view from ASBR 10A to PE 6B. ASBR 10A may redistribute the AIGP attribute as an IGP metric of PE 6A in AS 4A. In the example of FIG. 1. ASBR 10A may leak the AIGP attribute including the common core 3 metric (e.g., 10), static metrics of local links 14A (e.g., 1) and 14B (e.g., 1) and metric of AS 4B (e.g., 1000) as IGP metrics for AS 4A as if the cost metrics of different IGP domains were from a single IGP domain.

Accordingly, PE 6A may select the shortest path between two nodes (e.g., PE 6A to PE 6B) across IGP domains with non-uniform deployment of IGP in which to forward network traffic along the selected path like traditional BGP based inter-AS virtual private networks. Rather than selecting the shortest distance based on cost metrics from a single IGP domain or cost metrics across non-conforming IGP domains, PE 6A may determine distance based on the IGP metrics copied from the scaled AIGP attribute so that PE 6A may accurately determine the shortest path across IGP domains with non-uniform deployment of IGP.

As one example, PE 6A is multi-homed to ASBR 10A and 20A with immediate links 14A, 24A, wherein link 14A has a metric value of 100 and link 24A has a metric value of 500. In one example, ASBR 20A-20D may have the shortest distance between PEs 6. Ordinarily, PE 6A selects a route along the shortest distance (e.g., metric link 14A) based on the distance of the immediate links connected to PE 6A, without considering the links outside of IGP domain 5A. In accordance with techniques of this disclosure, IGP metric of PE 6A is substituted with the uniformly scaled end-to-end IGP metric value included in AIGP attribute. In this way, the techniques of this disclosure enable end-to-end unified metric-view such that PE 6A and PE 6B may send and receive links across IGP to BGP translations without losing IGP metrics, and may comprehensively evaluate IGP metrics, including non-IGP links, with an end-to-end metric view.

Figure 2:
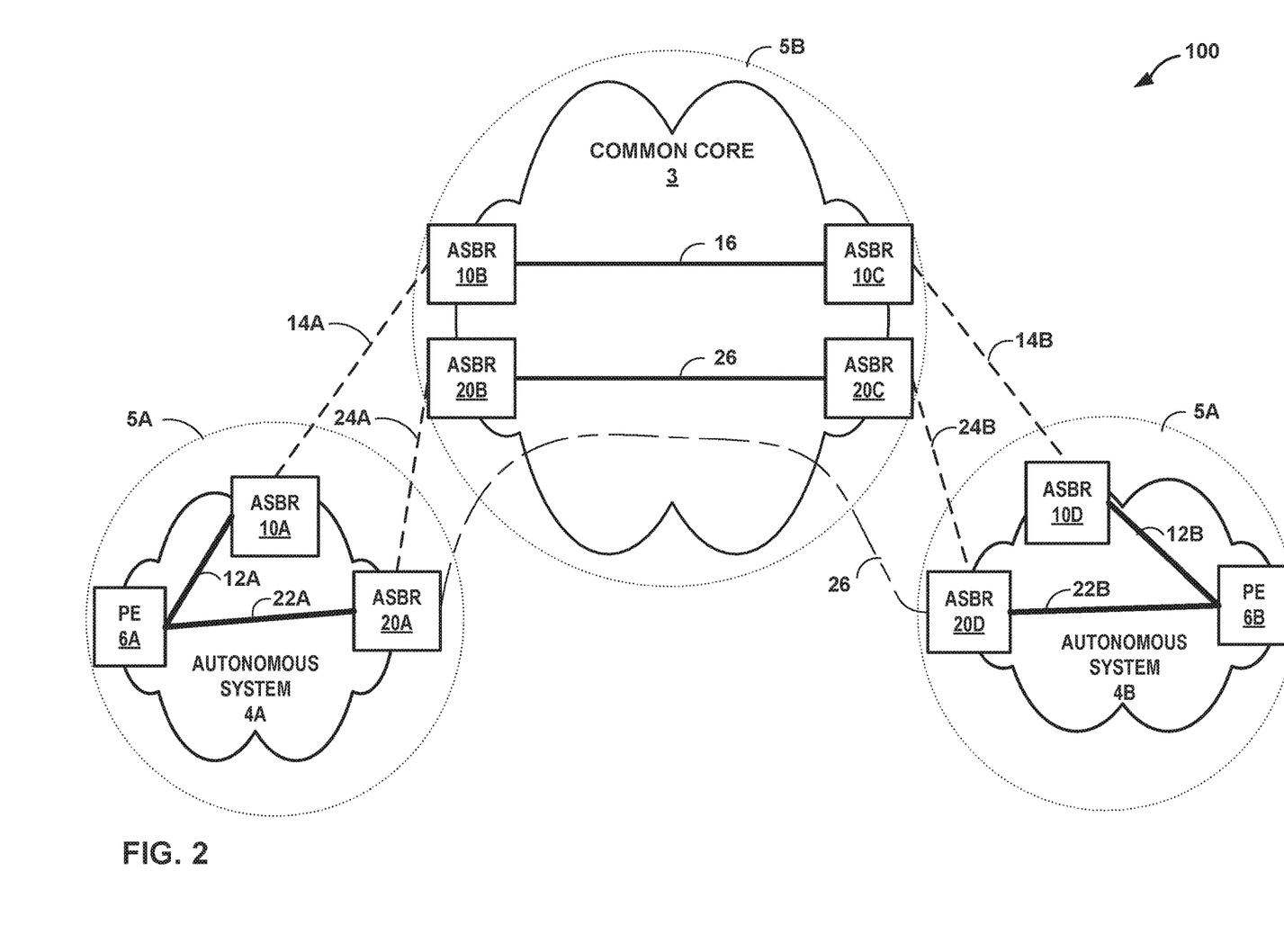
FIG. 2 is a block diagram illustrating an example using sham-link in accordance with the techniques described in this disclosure.

FIG. 2 is a block diagram illustrating an example using sham-link 26 in accordance with the techniques described in this disclosure. Network 100 of FIG. 2 is similar to network 10 of FIG. 1 except as described below. In some examples, AS 4A, 4B may have legacy IGP links, which may not use routes from common core 3 as the legacy IGP links prefer internal links instead of external links irrespective of its metric. Network 100 may include sham-link 26 between AS 4A to AS 4B to exchange LSAs. For example, ASBRs 20A, 20D may create an IGP adjacency to enable advertising of links as if learnt on direct adjacency. In this way, even if links are learnt via BGP (as described in FIG. 1), ASBRs 20A, 20D may alternatively advertise them as LSAs on sham-link 26 and thereby compete with the internal links based on scaled metrics. Examples of sham-links is described in RFC 4577, by E. Rosen et al., entitled "OSPF as the Provider/Customer Edge Protocol for BGP/MPLS IP Virtual Private Networks (VPNs)," dated June 2006, which is hereby incorporated by reference in its entirety.

In accordance with the techniques of this disclosure, sham-link 26 is assigned a metric value in accordance with the scaling techniques described herein. For example, sham-link 26 is configured to provide an inter-area link between PE 6A of one area and PE 6B of another area such that LSAs (including metrics) may be exchanged. When links are advertised on sham-link 26, ASBR 20D may assign a metric value of the scaled AIGP attribute (based on the techniques described in FIG. 1) to sham-link 26. As such, links may be advertised via either the common core 3 with BGP or sham-link 26.

As further described below, ASBR 20D may tag the route intending to be a sham-link end point with an administratively configured BGP-community. Such tagging provides an administrator granular control over the use of sham links. For example, by configuring a same community/node-admin tag on all routers, a full mesh of sham-links can be brought up. As further described below, a node-admin tag may be configured such that the node-admin tag is flooded in area-scope node-admin-tag LSA. Since the flooding is area-scope, only the pertinent areas (e.g., AS 4A and AS 4B) may receive the LSA and bring up sham-link 26. As such, the LSAs are received only when there is back-door connectivity for which sham-links are brought up. In this way, the configuration of the node-admin tag enables automatic discovery of sham-links based on BGP-route-tags to reduce configuration overhead. Further examples of OSPF node-admin tags are described in Internet Draft, by S. Hegde et al., entitled "Advertising per-node administrative tags in OSPF," dated Nov. 17, 2015, draft-ietf-ospf-node-admin-tag-09.txt, which is incorporated by reference as if set forth in its entirety.

Alternatively, by configuring the same community/node-admin tag on a distinct pair of routers, sham-links may be brought up between only the tagged routers. In other words, an administrator may choose mesh-sham-link connectivity with some ASBRs and/or choose a pair-wise sham-link for other ASBRs. In this way, routers may advertise IGP routes for sham-link 26 as if the BGP-community was a neighboring IGP network.

Figure 3:
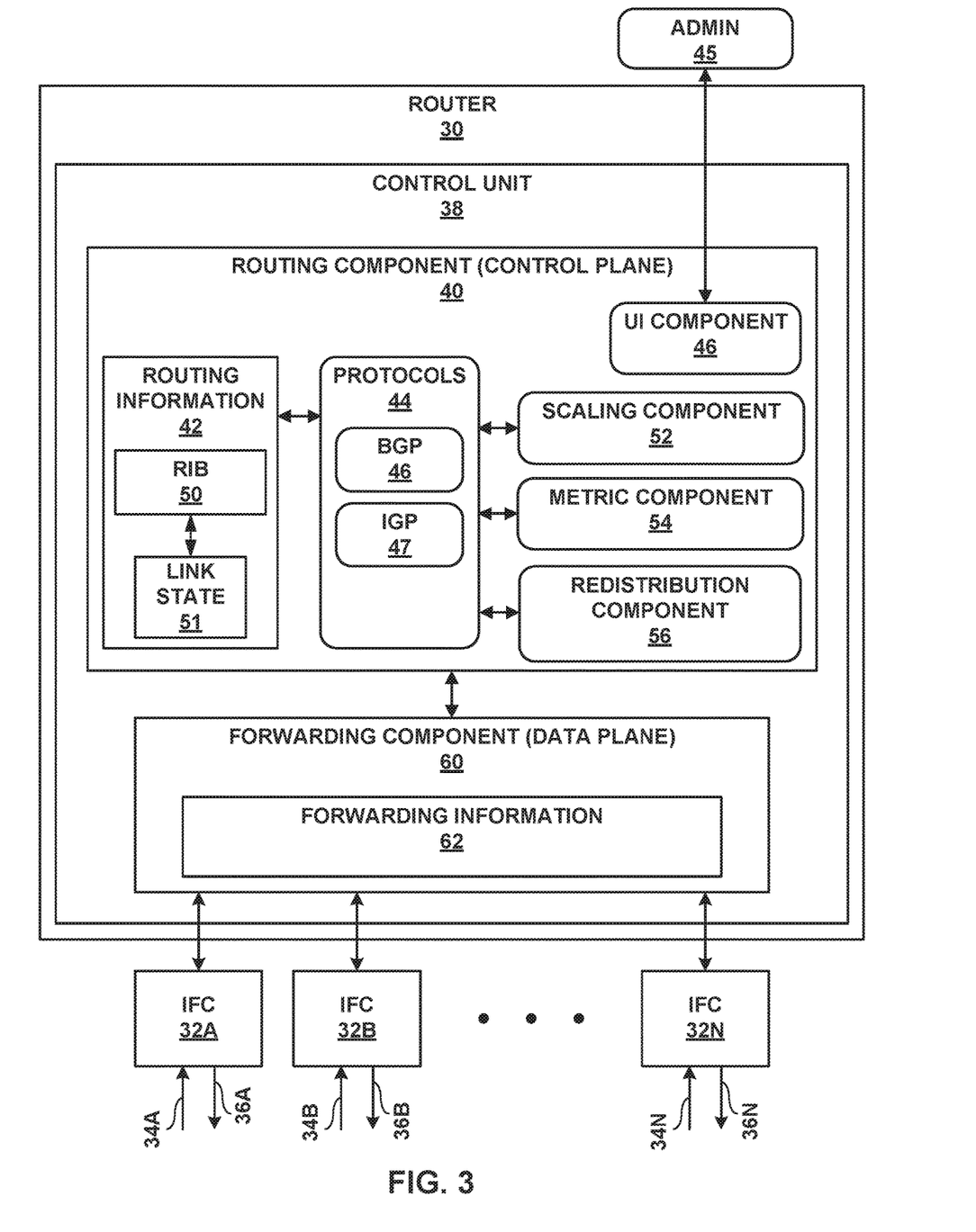
FIG. 3 is a block diagram illustrating an example router that performs various aspects of the techniques described in this disclosure.

FIG. 3 is a block diagram illustrating an example router 30 that performs various aspects of the techniques described in this disclosure. Router 30 may represent one of Autonomous System Boundary Routers 10A-10D, 20A-20D shown in the example of FIGS. 1 and 2. While described with respect to router 30, the techniques may be implemented by any other type of network device capable of implementing an IGP routing protocol, such as the IS-IS routing protocol or the OSPF routing protocol, a BGP routing protocol, such as the BGP routing protocol or BPU-LU routing protocol, and/or other interior/exterior gateway protocols. Thus, while described with respect to router 30, the techniques should not be limited to router 30 described with respect to the example of FIG. 3.

In the example of FIG. 3, router 30 includes interface cards 32A-32N ("IFCs 32") that receive and send data units, such as packet flows, via network links 34A-34N and 36A-36N, respectively. Router 30 may include a chassis (not shown) having a number of slots for receiving a set of cards, including IFCs 32. Each card may be inserted into a corresponding slot of the chassis for electrically coupling the card to routing component 40 via high-speed switch (not shown), which may comprise, for example, switch fabric, switchgear, a configurable network switch or hub, or other high-speed switching mechanisms. IFCs 32 may be coupled to network links 34A-34N and 36A-36N via a number of physical interface ports (not shown). Generally, IFCs 32 may each represent one or more network interfaces by which router 30 may interface with links of a network, such as links 14, 24 of AS 4 shown in the example of FIG. 1.

In general, router 30 may include a control unit 38 that determines routes of received packets and forwards the packets accordingly via IFCs 32. In the example of FIG. 3, control unit 38 includes a routing component 40 (control plane) that configures and controls packet forwarding operations applied by packet forwarding component 60 (data plane).

Routing component 40 provides an operating environment for various routing protocols 44 that execute at different layers of a network stack. Routing component 40 is responsible for the maintenance of routing information 42 to reflect the current topology of a network and other network entities to which router 30 is connected. In particular, routing protocols periodically update routing information 42 to accurately reflect the topology of the network and other entities based on routing protocol messages received by router 30. The protocols may be software processes executing on one or more processors. For example, routing component 40 includes network protocols that operate at a network layer of the network stack. In the example of FIG. 3, network protocols include a BGP routing protocol 46 and/or an IGP routing protocol 47.

In some examples, BGP routing protocol 46 may include a BGP routing protocol, a BGP-LU protocol, or other exterior gateway protocol. The BGP routing protocol implements an exterior gateway protocol for exchanging routing and reachability information between autonomous systems in accordance with RFC 4271, by Y. Rekhter et al., entitled "A Border Gateway Protocol 4," dated January 2006, which is incorporated by reference in its entirety. The BGP-LU routing protocol implements an exterior gateway protocol for exchanging routing and reachability information between autonomous systems in accordance with RFC 3107, by Y. Rekhter et al., entitled "Carrying Label Information in BGP-4," dated May 2001, which is incorporated by reference in its entirety. BGP routing protocol 46 also includes an AIGP protocol for enabling BGP/BGP-LU to carry IGP information in accordance with RFC 7311, by P. Mohapatra, entitled "The Accumulated IGP Metric Attribute for BGP," dated August 2014, which is incorporated by reference in its entirety.

In some examples, IGP routing protocol 47 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and Internet Draft for the Network Working Group, by A. Lindem et al., entitled "OSPFv3 LSA Extendibility," dated July 2013, draft-acee-ospfv3-lsa-extend-01.txt, each of which are incorporated by reference as if set forth in their respective entireties. IGP routing protocol 47 may also include an IS-IS routing protocol that implements an IGP for exchanging routing and reachability information within an autonomous system in accordance with RFC 1142, by D. Oran, entitled "OSI IS-IS Intra-domain Routing Protocol," dated February 1990, which is incorporated by reference in its entirety.

Routing component 40 may further include routing information base ("RIB") 50 and a link state database 51 ("LINK STATE") for storing routing information. Link state database 51 may store LSAs, metrics, and any other information or data used to identify or otherwise determine the network topology. In general, IGP 47 may update link state database 51 with data used to determine the network topology, including links, such as metrics. BGP 46 may update RIB 50 or otherwise store data specifying the links of the network. For example, in accordance with the techniques of this disclosure, link metrics from link state database 51 are pushed into RIB 50 such that the link metrics may be advertised across AS boundaries. Routing component 40 may maintain RIB 50 and link state database 51 in the form of one or more tables, databases, link lists, radix trees, flat files, graphs, or any other data structure. Based on RIB 50 and/or link state database 51, routing component 40 generates forwarding information 62 for IFCs 32.

Routing engine 38 may further include a user interface (UI) component 46. UI component 46 may represent a component that presents a user interface with which an administrator or other user, such as administrator 45 ("admin 45"), may interact to configure one or more policies (as described below) of scaling component 52, metric component 54, and/or redistribution component 56, as well as, routing component 40 generally.

Routing component 40 may include a scaling component 52 for scaling AIGP attributes in accordance with techniques described in this disclosure. For example, router 30 may receive a BGP message including one or more AIGP attributes with IGP metrics via IFCs 32. IFCs 32 may be configured to forward routing protocol packets or control packets, such as the received AIGP attribute to routing component 40. Scaling component 52 may be configured to scale the AIGP attribute to conform to the metric scale of the IGP domain for which the AIGP attribute is to be forwarded.

For example, IGP metrics from a provider edge router of an autonomous system (e.g., PE 6B of AS 4B) may be redistributed using BGP or BGP-LU with an IGP metric copied in an AIGP attribute. Router 30 may receive the AIGP attribute via IFCs 32, in which IFCs 32 forward the AIGP attribute to routing component 40. Scaling component 52 may determine that the received AIGP attribute of one IGP domain (e.g., IGP domain 5A of FIG. 1) is to be forwarded to another IGP domain (e.g., IGP domain 5B of FIG. 1). Scaling component 52 may scale the received AIGP attribute such that the AIGP attribute conforms to a metric scale of the IGP domain for which the route is forwarded.

As described below, an administrator 45 may configure scaling component 52 to scale (e.g., multiply, divide, etc.) the AIGP attribute by a particular factor, wherein the particular factor is the magnitude in which the metric scale of one IGP domain is needed to conform to the metric scale of another IGP domain. In one example, if the source IGP domain (e.g., AS 4B) is 10 for a 10 Gigabit Ethernet link and the core IGP domain (e.g., common core 3) is 100 for a 10 Gigabit Ethernet link, the particular factor in which AIGP attribute is multiplied by is 10. In another example, if the core IGP domain (e.g., common core 3) is 100 for a 10 Gigabit Ethernet link and the destination IGP domain (e.g., AS 4A) is 10 for a 10 Gigabit Ethernet link, the particular factor in which AIGP attribute is divided by is 10. Scaling component 52 then updates the scaled AIGP attribute to RIB 50.

In one example, admin 45 may configure scaling component 52 through UI component 46 to include the policy configuration:

```
set policy-options policy-statement to_core_adjust
term aigp_mul_term then aigp-adjust multiply 10 #
multiply aigp by 10
```

The above policy configuration is an example configuration in which the scaling component 52 may multiply the received AIGP attribute by a factor of 10 such that the AIGP attribute may conform to the metric scale of a different IGP domain, e.g., common core 3 of FIG. 1. Although not shown, the above policy configuration may also include dividing or other arithmetic calculation for conforming the received AIGP attribute from one IGP domain to another IGP domain.

Routing component 40 may also include a metric component 54 for assigning static metric values to non-IGP links in accordance with techniques described in this disclosure. For example, router 30 may be communicatively connected via non-IGP links (e.g., local links 14 and 24 of FIG. 1) to another router in a different IGP domain. Router 30 may receive a routing packet including one or more AIGP attributes with IGP metrics via IFCs 32 from the router in a different IGP domain. IFCs 32 may be configured to forward routing protocol packets or control packets, such as the received AIGP attribute, to routing component 40. Metric component 54 may determine and assign static metrics for non-IGP links interconnected with router 30 and add the static metrics to the received AIGP attribute. In one example, metric component 54 may determine from a BGP session that the link connecting router 30 to another IGP domain is not running IGP (e.g., local link 14B of FIG. 1) and may assign a static metric value for the link. Metric component 54 may add these static metric values (and scale, if necessary) to the AIGP attribute. Metric component 54 then updates the AIGP attribute with the added static metric values to RIB 50.

In one example, admin 45 may configure metric component 54 through UI component 46 to include the policy configuration:

```
set policy-options policy-statement to_core_adjust
term aigp_add_term then aigp-adjust add 10 # add
10 to aigp
```

The above policy configuration is an example configuration in which the metric component 54 may assign and add a static metric of a non-IGP link to AIGP attribute. In this example, metric component 54 may add a static metric value of 10 for a non-IGP link, e.g., local link 14B of FIG. 1. In this way, metric component 54 may update the AIGP attribute to provide a comprehensive end-to-end metric view of links across multiple IGP domains and non-IGP links.

Routing component 40 may include a redistribution component 56 for leaking an adjusted AIGP attribute from BGP to IGP in accordance with techniques described in this disclosure. For example, router 30 may be immediately connected to a destination router (e.g., PE 6A) that may implement IGP and not BGP. When router 30 receives the adjusted AIGP attribute, router component 40 may use redistribution component 56 for setting the adjusted AIGP attribute as an IGP metric of destination router such that the devices in this IGP domain may receive a uniformly scaled end-to-end IGP metric view across multiple IGP domains. In one example, the scaled AIGP attribute stored in RIB 50 is copied to link state database 51.

In one example, admin 45 may configure redistribution component 56 through UI component 46 to include the policy configuration:

```
#show policy-optons policy-statement leak-bgp-to-ospf
term one {
from protocol bgp;
then {
metric aigp; # action to set IGP metric to BGP's
AIGP value
external {
type 1;
}
accept;
}
}
```

The above policy configuration is an example configuration in which the redistribution component 56 may set an updated AIGP attribute, including scaled metric links and/or static metrics of non-IGP links, as an IGP metric of destination router. In one example, redistribution component 56 may leak the BGP route, including adjusted AIGP attribute, to OSPF, which is the IGP of the destination router. As one example, redistribution component 56 may push the link information from RIB 50 to link state database 51. In some examples, redistribution component 56 may perform leak route prefixes from one virtual routing and forwarding ("VRF") instance to another VRF instance on the same physical router. In other words, redistribution component 56 enables routes learned from routing protocols such as BGP and OSPF from a source VRF to a destination VRF.

In another example (as described in FIG. 2), sham-links are established to create an IGP adjacency to enable advertising of links as if learnt on direct adjacency. At the sham-link end points, one or more sham-link community identifiers are configured to associate the sham-link end points with a BGP-community. As one example, admin 45 may configure tags through UI component 46 for different BGP-communities for each of the areas where the policy configuration joins two areas, e.g., AS 4A and AS 4B of IGP domain 5A, to include a sham-link:

```
set policy-options community dyn_sham_link
members [<shm_comm_area1> <shm_comm_area2>]
```

In some examples, the policy configuration for configuring sham-link community identifiers associated with the receiving end may include:

```
+ set protocol ospf area <area_id1> dynamic_sham_link
<shm_comm_area1>
``` where the policy configuration associates a dynamic sham-link to a specific area (e.g., ASBR 20A or 20D). For example, a sham-link may be assigned to an IGP domain such that the IGP domain may advertise IGP across the sham-link.

In another example, admin 45 may configure tags through UI component 46 for OSPF node-admin tags. In one example, the policy configuration for using node-admin tags may include:

set protocol ospf node-admin-tag <tag_value>

This node-admin tag may be flooded in a LSA. Once receiving this LSA, the receiving node (e.g., ASBR 20A) may bring up a sham-link to the loopback address of the node originating the node-admin tag. In this way, sham-link 26 may be used to provide IGP adjacency to configured remote ASBRs and thereby advertises links as if learnt on direct adjacency.

In the example of FIG. 3, control unit 38 includes a forwarding component 60. Forwarding component 60 may be coupled to IFCs 32 and/or routing component 40, e.g., via a high-speed switch and internal data paths (not shown). Routing component 40 generates and programs forwarding component 60 with forwarding information 62 associating network destinations with specific next hops and corresponding interface ports of IFCs 32 in accordance with routing information 42. Based on forwarding information 62, forwarding component 60 forwards packets received from inbound links 34A-34N to outbound links 36A-36N that correspond to next hops associated with destination of the packets.

After configuring routing component 40 in this manner, admin 45 may then activate or otherwise enable router 30 to begin processing packets, such as standard IP packets that are forwarded in accordance with forwarding information 62. Prior to forwarding these packets, scaling component 52, metric component 54, and/or redistribution component 56 may update a received AIGP attribute to generate a uniformly scaled end-to-end metric view of links across various IGP domains. Although FIG. 3 provides an example of policy configuration via the UI component 46, router 30 may dynamically configure the policies of the techniques of this disclosure.

The architecture of router 30 illustrated in FIG. 3 is shown for exemplary purposes only. The techniques of this disclosure are not limited to this architecture. In other examples, Router 30 may be configured in a variety of ways. In one example, some of the functionality of control unit 38 may be distributed within IFCs 32. In another examples, control unit 38 may comprise a plurality of packet forwarding engines operated as slave routers.

Control unit 38 may be implemented solely in software, or hardware, or may be implemented as a combination of software, hardware, or firmware. For example, control unit 38 may include one or more processors that execute software instructions. In that case, the various software modules/components of control unit 38 may comprise executable instructions stored on a computer-readable medium, such as computer memory or hard disk.

Figure 4:
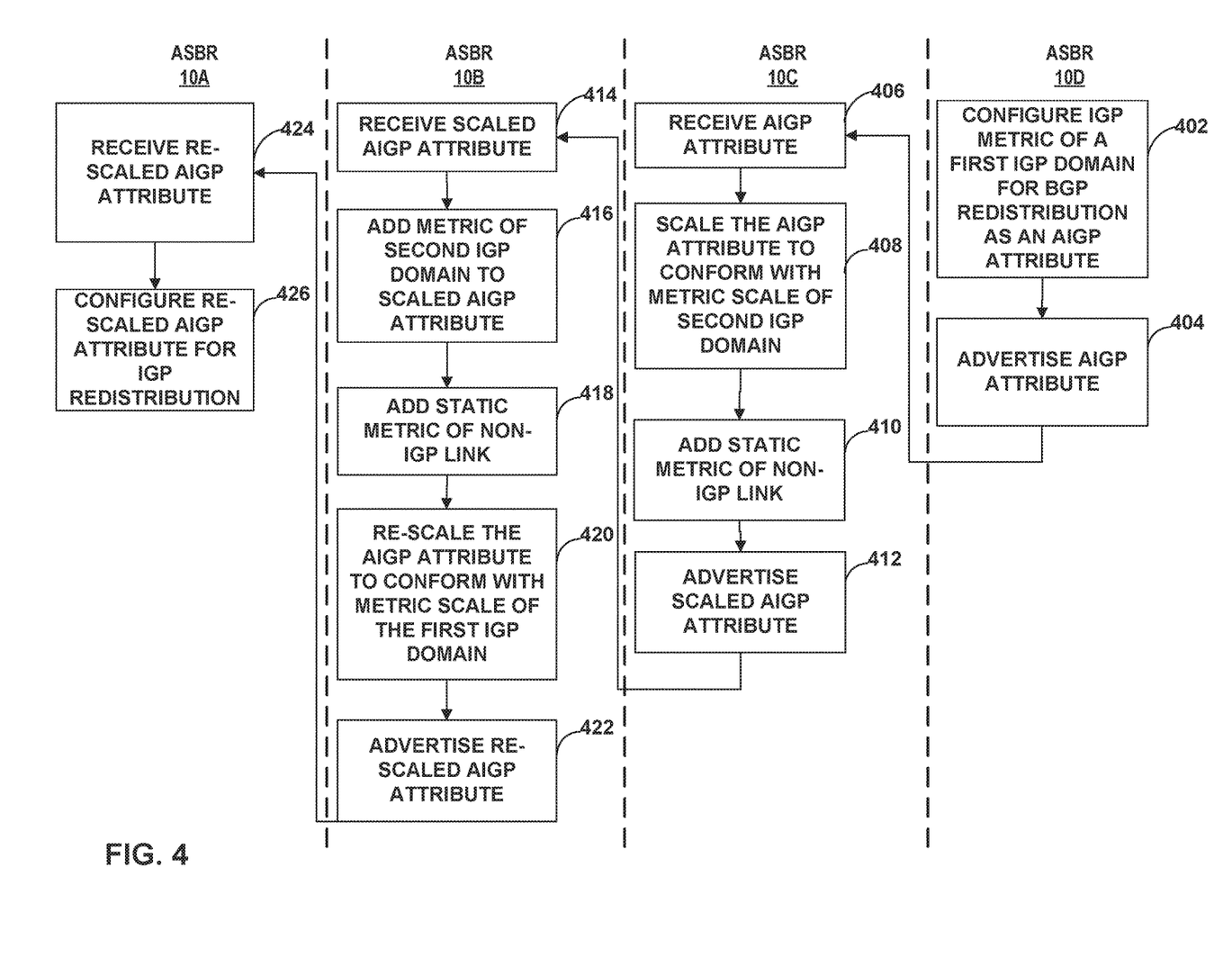
FIG. 4 is a flowchart illustrating an example operation of network devices in implementing the techniques described in this disclosure.

FIG. 4 is a flowchart illustrating an example operation of network devices, such as ASBRs 10, 20 shown in the example of FIG. 1, in implementing the techniques described in this disclosure. Referring to the example system shown in FIG. 1, ASBR 10D may include a redistribution component 56 to configure BGP redistribution of an IGP metric of a first IGP domain (e.g., domain implementing OSPF), wherein a packet with the IGP metric is copied in an AIGP attribute (402). For example, a first IGP domain may include an accumulated IGP metric with a value of 1000 for a 10 Gigabit Ethernet link. ASBR 10D may copy the IGP metric value of 1000 to an AIGP attribute such that the IGP metric may be redistributed in BGP.

ASBR 10D may then advertise the AIGP attribute in a BGP session with ASBR 10C including the IGP metric value of 1000 of the first IGP domain (404). For example, forwarding component 60 of ASBR 10D may be configured to forward the AIGP attribute to interconnecting routers, e.g., ASBR 10C.

ASBR 10C may receive the advertised AIGP attribute including the IGP metric value of 1000 of the first IGP domain (406). For example, IFC 32 of ASBR 10C may receive the route including the AIGP attribute. IFC 32 of ASBR 10C may forward the route to routing component 40. Scaling component 52 of ASBR 10C may scale the received AIGP attribute to conform the IGP metric value of 1000 to the metric scale of a second IGP domain (e.g., IGP domain implementing IS-IS) (408). For example, the second IGP domain (e.g., common core 3 of FIG. 1) may include a metric scale of 100 for a 10 Gigabit Ethernet link. As such, to conform the metric of the first IGP domain to the second IGP domain, scaling component 52 may multiply the metric value of 1000 of the first IGP domain by a factor of 10. In this way, the AIGP attribute is adjusted to the metric scale of the second IGP domain.

A BGP session connecting ASBR 10C and 10D enables ASBR 10C to receive the AIGP attribute via a non-IGP link. Metric component 54 of ASBR 10C may add a static metric for the non-IGP link such that the scaled AIGP attribute may also include a metric value for the non-IGP link (410). For example, local link 14B is a non-IGP link and may interconnect ASBRs 10C and 10D. Metric component 54 of ASBR 10C may assign a static metric value, e.g., 1, to the non-IGP link used to advertise the AIGP attribute from ASBR 10D to ASBR 10C.

ASBR 10C may then advertise the scaled AIGP attribute, including the scaled IGP metric value of the first IGP domain and the static metric of the non-IGP link (412). For example, the scaled AIGP attribute includes a metric value of 10,000 (IGP metric value of 1000 multiplied by 10) and a static metric of 10 for the non-IGP link (static metric value of 1 multiplied by 10). For example, forwarding component 60 of ASBR 10C may forward the scaled AIGP attribute to interconnecting routers, e.g., ASBR 10B.

ASBR 10B may receive the scaled AIGP attribute based on the scaled IGP metric of the first IGP domain and the scaled static metric of the non-IGP link (414). For example, IFC 32 of ASBR 10B may receive the route including the scaled AIGP attribute. IFC 32 of ASBR 10B may forward the received route to routing component 40. ASBR 10B may include a metric component 54 that may add a metric value of a second IGP domain to the scaled AIGP attribute (416). In one example, the second IGP domain (e.g., common core 3 implementing IS-IS) may have a metric value of 100. Metric component 54 of ASBR 10B may add the metric value of 100 to the scaled AIGP attribute such that the scaled AIGP attribute includes the metric values of the first IGP domain and the second IGP domain.

ASBR 10B may also add a static metric value of a non-IGP link connecting ASBRs 10B and 10A (418). For example, a non-IGP link (e.g., local link 14A of FIG. 1) may interconnect ASBRs 10A and 10B such that ASBRs 10A and 10B may advertise routes in a BGP session. In one example, metric component 54 of ASBR 10B may assign a scaled static metric value of 10 (static metric value of 1 multiplied by 10) for the non-IGP link and may add the assigned static metric to the scaled AIGP attribute.

ASBR 10B may also re-scale the AIGP attribute to conform the scale of the AIGP attribute to a metric scale of the first IGP domain (e.g., OSPF) (420). For example, the AIGP attribute is previously scaled according to the metric scale of the second IGP domain. The previously scaled AIGP attribute includes an IGP metric value of 100 for the second IGP domain, IGP metric value of 10,000 for the first IGP domain, and static metric values of 10 for each of the non-IGP links (e.g., local links 14A, 14B). Scaling component 52 of ASBR 10B is configured to re-scale the AIGP attribute by dividing the previously scaled AIGP attribute by 10 such that the AIGP attribute may conform to the metric scale of the first IGP domain. Accordingly, the re-scaled AIGP attribute may include an IGP metric value of 10 for the common core, an IGP metric value of 1,000 for the first IGP domain, and static metric values of 1 for each of the non-IGP links (e.g., local links 14A, 14B). In this way, the re-scaled AIGP attribute may include a uniformly scaled end-to-end metric view from ASBR 10B to PE 6B of the first IGP domain.

ASBR 10B may then advertise the updated AIGP attribute to client-facing ASBR 10A (422). For example, forwarding component 60 of ASBR 10B may be configured to forward the re-scaled AIGP attribute to interconnecting routers, e.g., ASBR 10A.

ASBR 10A may receive the re-scaled AIGP attribute (424) and redistribute the re-scaled AIGP attribute to IGP (426). For example, IFC 32 of ASBR 10A may receive the route including the re-scaled AIGP attribute. IFC 32 of ASBR 10A may forward the received route to routing component 40. Client-facing ASBR 10A may include a redistribution component 56 configured to leak the re-scaled AIGP attribute from BGP to IGP. Redistribution component 56 may set the IGP metric of PE 6A to the re-scaled AIGP attribute such that cost metrics are known across IGP domains deploying non-uniform IGP without losing end-to-end IGP metric values, and can make more accurate routing decisions based on a comprehensive uniform scaled view of metrics across a plurality of IGP domains.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software components or hardware components.

Various aspects of the techniques have been described. These and other aspects are within the scope of the following claims.

The invention claimed is:

1. A method comprising:
receiving, by a network device positioned on a border of a second interior gateway protocol (IGP) domain and in accordance with a border gateway protocol (BGP), an accumulated IGP (AIGP) attribute of a first IGP domain that includes a link metric assigned to a link within the first IGP domain according to a metric scale of the first IGP domain;
converting, by the network device, the link metric assigned to the link within the first IGP domain according to the metric scale of the first IGP domain to a metric scale of the second IGP domain to obtain a scaled link metric that conforms to the metric scale of the second IGP domain, the metric scale of the first IGP domain being different than the metric scale of the second IGP domain;
updating, by the network device, a representation of a topology of a network including the first and second IGP domains to include the scaled link metric and add a static metric assigned to a non-IGP link interconnecting the first IGP domain and the second IGP domain;
adding the static metric to the link metric to update the AIGP attribute to reflect the non-IGP link interconnecting the first IGP domain and the second IGP domain; and
advertising, in accordance with BGP, the updated AIGP attribute.

2. The method of claim 1, further comprising:
selecting, by the network device, a path through the network based on the updated representation of the topology of the network; and
forwarding, by the network device, network traffic along the selected path.

3. The method of claim 1, wherein updating the representation of the topology of the network comprises adding a link metric assigned to a link within the second IGP domain.

4. The method of claim 1, further comprising:
configuring, by the network device, a sham-link to provide a logical construct of a tunnel to advertise routes as an internal route within the first IGP domain; and
assigning, by the network device, a link metric of the sham-link based on the updated representation of the topology of the network.

5. The method of claim 4, wherein configuring the sham-link comprises:
setting one or more BGP-communities as tags to the internal route.

6. A router comprising:
at least one processor coupled to a memory, wherein the processor executes software configured to:
receive, in accordance with a border gateway protocol (BGP), an accumulated IGP (AIGP) attribute of a first IGP domain that includes a link metric assigned to a link within the first IGP domain according to a metric scale of the first IGP domain;
convert the link metric assigned to the link according to the metric scale of the first IGP domain to a metric scale of a second IGP domain to obtain a scaled link metric that conforms to the metric scale of the second IGP domain, the metric scale of the first IGP domain being different than the metric scale of the second IGP domain;
update a representation of a topology of a network including the first and second IGP domains to include the scaled link metric and add a static metric assigned to a non-IGP link interconnecting the first IGP domain and the second IGP domain;
add the static metric to the link metric to update the AIGP attribute to reflect the non-IGP link interconnecting the first IGP domain and the second IGP domain; and
advertise, in accordance with BGP, the updated AIGP attribute.

7. The router of claim 6, wherein the processor further executes software configured to:
select a path through the network based on the updated representation of the topology of the network; and
forward network traffic along the selected path.

8. The router of claim 6, wherein the processor executing software configured to update the representation of the topology of the network comprises software configured to add a link metric assigned to a link within the second IGP domain.

9. The router of claim 6, wherein the processor further executes software configured to:
configure a sham-link to provide a logical construct of a tunnel to advertise routes as an internal route within the first IGP domain; and assign a link metric of the sham-link based on the updated representation of the topology of the network.

10. The router of claim 9, wherein the software configured to configure the sham-link comprises software configured to:
set one or more BGP-communities as tags to the internal route.

11. A computer system comprising:
one or more processors, one or more computer-readable memories, and one or more non-transitory computer-readable storage mediums;
program instructions stored on at least one of the one or more storage mediums for execution by at least one of the one or more processors via at least one of the one or more memories, to:
receive, in accordance with a border gateway protocol (BGP), an accumulated IGP (AIGP) attribute of a first IGP domain that includes a link metric assigned to a link within a first IGP domain according to a metric scale of the first IGP domain;
convert the link metric assigned to the link according to the metric scale of the first IGP domain to a metric scale of a second IGP domain to obtain a scaled link metric that conforms to the metric scale of the second IGP domain, the metric scale of the first IGP domain being different than the metric scale of the second IGP domain;
update a representation of a topology of a network including the first and second IGP domains to include the scaled link metric and add a static metric assigned to a non-IGP link interconnecting the first IGP domain and the second IGP domain;
add the static metric to the link metric to update the AIGP attribute to reflect the non-IGP link interconnecting the first IGP domain and the second IGP domain; and
advertise, in accordance with BGP, the updated AIGP attribute.

12. The computer system of claim 11, further comprising:
program instructions stored on at least one of the one or more storage mediums for execution by at least one of the one or more processors via at least one of the one or more memories, to select a path through the network based on the updated representation of the topology of the network; and
program instructions stored on at least one of the one or more storage mediums for execution by at least one of the one or more processors via at least one of the one or more memories, to forward network traffic along the selected path.

13. The computer system of claim 11, wherein the program instructions to update the representation of the topology of the network comprises program instructions to add a link metric assigned to a link within the second IGP domain.

14. The computer system of claim 11, further comprises:
program instructions stored on at least one of the one or more storage mediums for execution by at least one of the one or more processors via at least one of the one or more memories, to configure a sham-link to provide a logical construct of a tunnel to advertise routes as an internal route within the first IGP domain; and
program instructions stored on at least one of the one or more storage mediums for execution by at least one of the one or more processors via at least one of the one or more memories, to assign a link metric of the sham-link based on the updated representation of the topology of the network.

* * * * *